June 2, 1953

J. DUNGLER
CONVEYING MEANS FOR WEBS OR SHEETS 2,640,277

Filed March 11, 1949

INVENTOR:
JULIEN DUNGLER
BY Leon M. Strauss
AGT.

June 2, 1953     J. DUNGLER     2,640,277
CONVEYING MEANS FOR WEBS OR SHEETS
Filed March 11, 1949     4 Sheets-Sheet 2

INVENTOR:
JULIEN DUNGLER
BY [signature]

June 2, 1953  J. DUNGLER  2,640,277
CONVEYING MEANS FOR WEBS OR SHEETS
Filed March 11, 1949  4 Sheets-Sheet 3

INVENTOR:
JULIEN DUNGLER
BY Leon M. Straus

June 2, 1953  J. DUNGLER  2,640,277
CONVEYING MEANS FOR WEBS OR SHEETS
Filed March 11, 1949  4 Sheets-Sheet 4
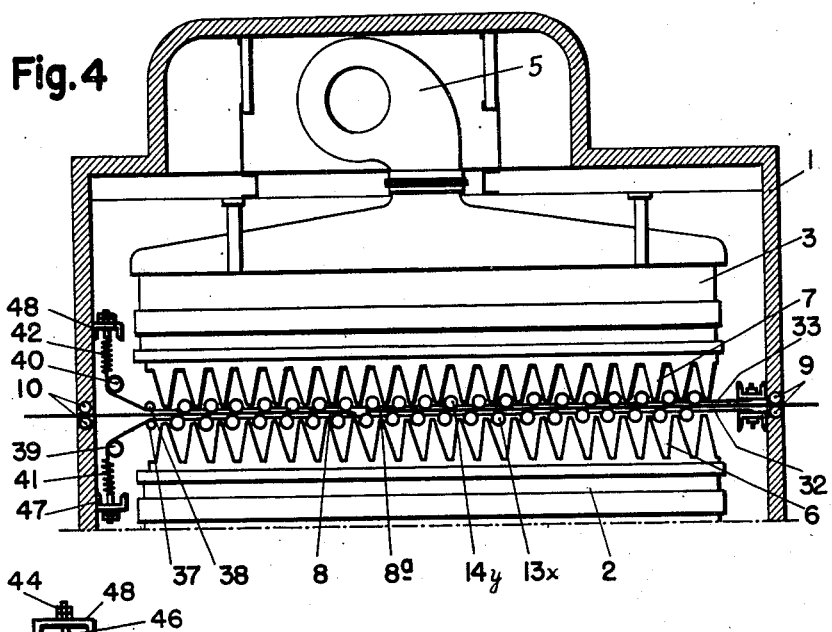
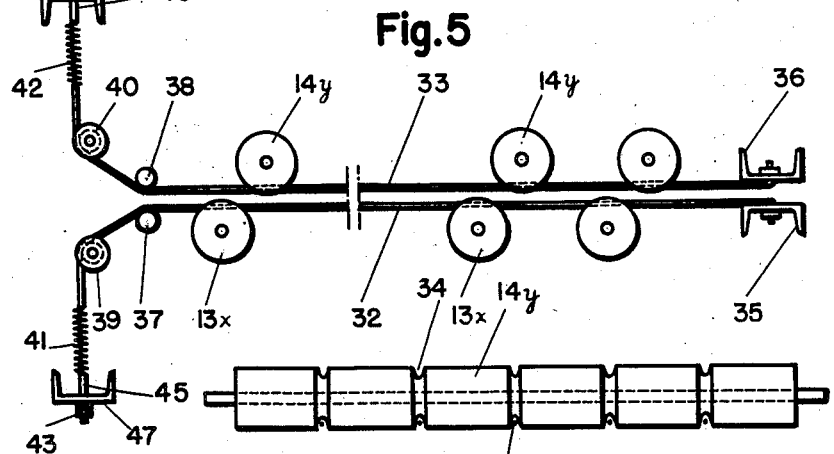
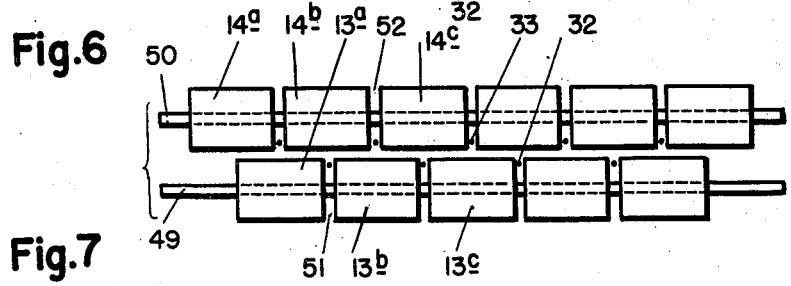
INVENTOR:
JULIEN DUNGLER
BY Leon M. Strauss

UNITED STATES PATENT OFFICE 2,640,277

CONVEYING MEANS FOR WEBS OR SHEETS

Julien Dungler, Basel, Switzerland

Application March 11, 1949, Serial No. 80,932
In France March 24, 1948

10 Claims. (Cl. 34—160)

The present invention concerns a conveyor arrangement or device for use in connection with drying or like machines, in which products are treated at open width and in continuous length, but in which breaks or gaps are liable to occur, such products being cardboard, paper, fabric, linoleum, or the like.

The conveying of strips of paper, fabric or like material, through a drying machine or the like, involves several problems. In most cases, the surface of the treated product must remain accessible to the treating agents such as a drying fluid, while the product is passed through the machine. This condition can, for example, be fulfilled by conveying the product to be treated by means of parallel narrow bands on which it is placed. However, in this method of traversing, the product to be treated remains in permanent contact with its support (in this case the conveyor bands) which is liable to produce marks on the treated product. This drawback can be avoided by causing the product to travel through the machine by means of spaced stationary rotary members over which the product to be treated passes in such a manner as to be stretched freely between two successive rotary members. However, in the case of a break occurring in the treated product, due for example to a breakage during the treatment, serious operational disturbances may occur owing to the fact that the treated product, which is no longer supported at the location of the break, leaves the predetermined path and can only be returned thereto by stopping the machine and then effecting a more or less complicated repair.

The device according to the invention, which overcomes the above mentioned drawbacks, comprises two groups of conveying and supporting members, the first of which is formed by stationary rotating members which are spaced along the path of the product to be treated and are so arranged as to come into contact with the product and impart a translatory movement thereto, whereas the second group is formed by members which extend along the path of the product to be treated and are located a short distance from same in such a manner as not to come into contact with the product to be treated during normal operation, but to support said product temporarily in case a break occurs therein.

According to the invention, the members of the second group which are adapted to support the product temporarily, are movable and effect a translatory movement.

According to a feature of the invention, the members of the second group which are adapted to support the product temporarily, are fixed.

According to another feature of the invention, the speed of rotation of the rotary members and the speed of translation of the movable members are so adjusted that the speed of translation of the movable members is equal to the speed of translation imparted to the treated product by the rotary members.

According to a further feature of the invention, the movable members pass over the stationary rotary members.

According to still a further feature of the invention, the stationary rotary members and/or the translatory movable members may be located on either side of the product to be treated.

According to still another feature of the invention, the conveying members located on either side of the product to be treated may either be exactly opposite one another, or be staggered with respect to one another in such a manner that the elements of the group of stationary members are staggered with respect to one another in the longitudinal direction, whereas the elements of the group of movable members are staggered in the transverse direction.

According to a still further feature of the invention, the rotary stationary members are formed by rollers, while the members which are adapted to effect a translatory movement are formed by endless cables or other endless members that pass through grooves provided in the rollers, the depth of said grooves being greater than the diameter of the cables so that the cables do not come into contact with the product supported by the rollers.

According to still another feature of the invention, the rotary movement is imparted to the rollers by endless cables that pass over them.

According to yet another feature of the invention, the fixed and temporary supporting members are formed by bars, wires, rods, cables, or like members, which are of small size in transverse direction and are arranged parallel to the products to be treated and also at some distance from same.

According to a further feature of the invention, the fixed members are provided, at least at one of their ends with tensioning means that enable a tension to be imparted to said members so as to ensure their correct position and operation.

According to still another feature of the invention, the fixed members extend continuously over substantially the whole useful length of the machine which is equipped therewith, and in such a manner as to pass through the locations of the rotary members without coming into contact with same.

According to another feature of the invention, the rotary stationary members are provided, opposite the point where the fixed members pass, with grooves or the like which are so arranged as to enable the fixed members to be placed in such a manner that the same do not come into contact with the rotary members or, during normal operation, with the product to be treated.

According to yet another feature of the invention, the rotary members are formed by individual elements which are separated from one another in the axial direction and between which the fixed members are adapted to pass.

According to a further feature of the invention, the peripheral speeds of the individual rotary members may be different from one another so as to obtain packing, contracting or like effects.

Other features and advantages of the invention will moreover become apparent from the ensuing description: reference being made to the accompanying drawings in which:

Fig. 4 is a view similar to that of Fig. 1, showing a modification with fixed temporary supporting members.

Fig. 5 is a detail view of Fig. 4, showing the relative arrangement of the rotary conveying members and the fixed temporary supporting members.

Fig. 6 shows a front elevational view of the rotary members, and

Fig. 7 shows the rotary members of Fig. 6 in modified form.

Figure 1:
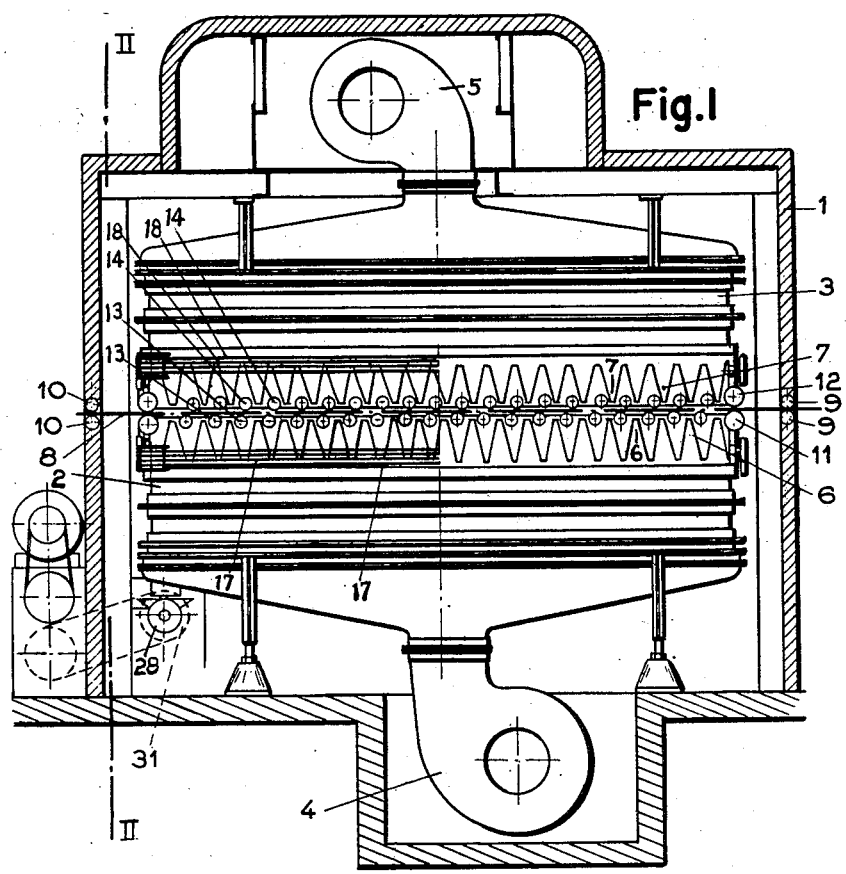
Fig. 1 is partly an elevation view and partly a longitudinal section, of a drying machine equipped with a conveying device according to the invention and provided with movable temporary supporting members.
Figure 2:
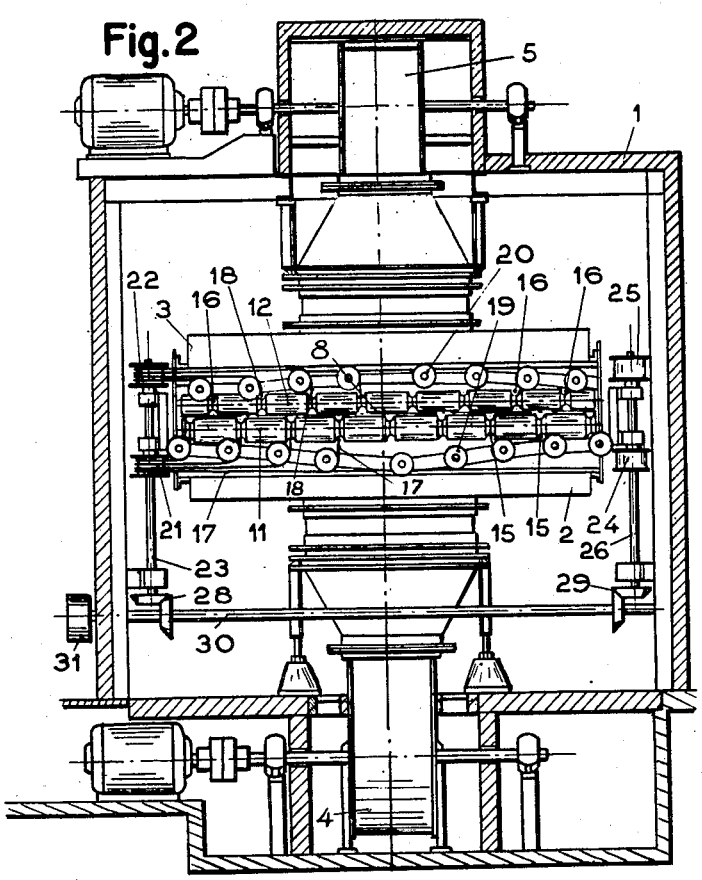
Fig. 2 is a section taken along line II—II of Fig. 1.

Referring first to Figs. 1 and 2, the chamber 1 of a drying machine contains a lower box-like member 2 and an upper box-like member 3 which are respectively connected to blowers 4 and 5 and are respectively provided with rows of blowing nozzles 6 and 7.

Within the space betwen the rows of nozzles 6 and 7 is a treatment space through which passes the product 8 to be treated, such as a strip or web of paper, cardboard, fabric or the like. Said strip enters the chamber 1 through engagement with the inlet rollers 9, travels through the treatment space between the nozzles 6 and 7, for example, in order to be dried by hot air or fluid supplied by the blowers 4 and 5, and leaves the drying machine by passing between the outlet rollers 10.

Inside the chamber 1, the strip 8 passes between a pair of drawing rollers 11 and 12, and then between two rows of rollers, a lower row of rollers 13 and an upper row of rollers 14. It should be noted that the lower and upper rollers are staggered with respect to one another in the longitudinal direction of the chamber. However, this arrangement is not essential and said rollers could also, in certain cases, be located exactly opposite one another.

The lower rollers 13 and the upper rollers 14 are provided with grooves 15 and 16 respectively, which are distributed over their width and which are intended to accommodate endless cables 17 and 18, respectively. It should be observed that the depth of said grooves is greater than the diameter of the cables. On the other hand, the cables 17 are staggered in the transverse direction with respect to the cables 18.

At the ends of the machine, the cables 17 and 18 pass over separate loose return rollers 19 and 20, respectively, and then over driving rollers 21 and 22 on the one hand, mounted on a common driving shaft 23, and over rollers 24 and 25 on the other hand, mounted on another common driving shaft 26. By means of bevel gears 28 and 29, the driving shafts 23 and 26 are driven by an actuating shaft 30 by means of a pulley 31.

The above device operates as follows: When the actuating shaft 30 is rotated, the cables 17 and 18, which are driven by the pulleys 21, 22, 24, 25, effect a translatory movement which causes them to pass, in particular along the space formed between the nozzles 6 and 7.

By means of this translatory movement, the cables 17 and 18 impart a rotary movement to the rollers 11, 12, 13, 14, owing to the fact that they are in contact with said rollers as they pass through the grooves 15 and 16.

The fabric, or other product to be treated 8, which is in contact with the rollers 13 and 14, is carried along by the rotation of same so as to pass through the machine and be dried by the hot air or other medium blown against its surface by the nozzles 6 and 7.

Owing to the fact that the depth of the grooves 15 and 16 is greater than the diameter of the cables 17 and 18, said cables do not come normally into contact with the fabric 8 which is stretched between the rollers 13 and 14. In this manner the travel through the machine cannot leave any marks on the fabric 8, owing to the fact that the contact of same with its support is only temporary. Furthermore, the air issuing from the nozzles 6 and 7 freely reaches the fabric 8 through the interstices that exist between the rollers 13 and 14 on the one hand, and the cables 17 and 18 on the other hand.

In the case of a break occurring in the fabric or in a strip of paper or the like 8, the free ends formed by said break come to rest on the cables 17 which thus ensure their travel through the machine without the strip 8 being able to leave the predetermined path despite the break that has occurred. Owing to the fact that the cables pass over the rollers 13 and 14, the strip 8 is constrained to pass between the rollers 13 and 14 as in normal operation.

As soon as the broken section of the strip 8 has left the machine, i. e. after the continuity of the strip 8 has been restored inside the chamber 1, the conditions of normal operation are automatically restored, during which the strip 8 is again and only in contact with the rollers 13 and 14.

Figure 3:
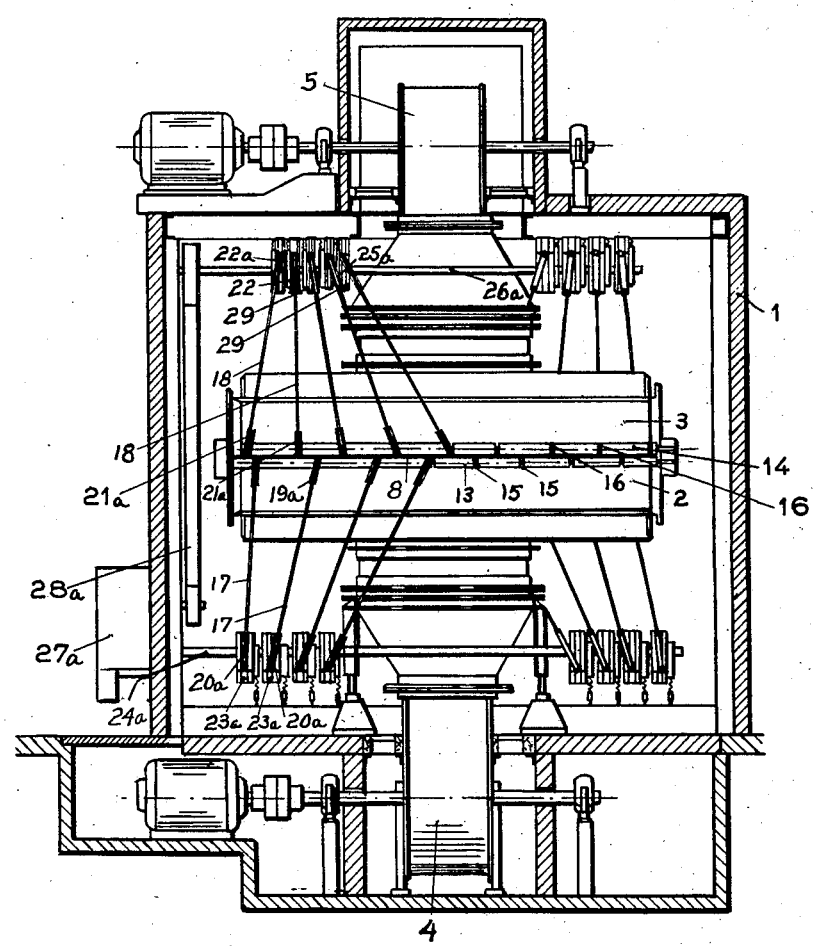
Fig. 3 is a view similar to that of Fig. 2, but showing a modified form of the invention.

Whereas in the embodiment of Figs. 1 and 2 the return of the cables 17 and 18 is effected at the side, Fig. 3 shows a modification in which the return of the cables is effected, respectively, below and above the traversing rollers. The arrangement of the chamber 1, the box-like members 2 and 3, the blowers 4 and 5, the nozzles 6 and 7 and the rollers 13 and 14 is substantially identical to that of the embodiment of Figs. 1 and 2.

On the other hand, after having left the rollers 13 and 14, the cables 17 and 18 pass over return rollers 19a, 20a and 21a, 22a respectively, in order to effect their return respectively below and above the box-like members 2 and 3 by passing respectively over driving pulleys 23a and 25a respectively mounted on driving shafts 24a and 26a respectively which are driven by a gear 27 and by means of a belt 28a.

The operation of this device is identical to that of the embodiment of Figs. 1 and 2, with the sole difference that the return of the cables is effected along the top and the bottom instead of being effected at the side.

The rollers 13 and 14 may, in certain cases, be driven by a chain and sprocket drive. In this case, the cables 17 and 18 are retained; it will be certain that the peripheral speed of the rollers corresponds exactly to the linear speed of said cables.

The rollers 13 and 14 may be of a diameter that changes from the front to the rear of the machine, in order to adapt the peripheral speed of the rollers to the speed of traverse of the strip or web of product to be treated, taking into account the contractions or elongations that may occur during the treatment.

Fig. 4 shows a modification of the fixed temporary supporting members and shows a stage of the treatment in which two lengths of treated products 8 and 8a are engaged in the machine. Said products may, for example, be formed by sheets of cardboard intended to be dried by passing between the rows of nozzles 6 and 7. For this purpose, the conveying of the sheets through the machine is effected by the upper rotary stationary rollers 14y and the lower rotary stationary rollers 13x respectively, which are rotated about their respective shafts by any means (not shown). It is to be noted that the peripheral speeds of said rollers may be identical or different. Thus, it is possible for example to give the inlet rollers a higher peripheral speed than the other rollers in order to obtain packing, contraction, or like effects. This difference of peripheral speed can be obtained by giving the first rollers a higher speed of rotation, by increasing their diameters while driving them at the same speed of rotation as the other rollers, or in any other suitable manner to attain this end.

In order to support the treated products temporarily between the spaced conveying rollers when a break occurs or when there is a gap, upper and lower fixed supporting members 33 and 32 respectively, comprising bars, wires, or rods, cables or other suitable elongated means which are of small size in the transverse direction so as not to hinder the circulation of the drying fluid, and are provided on either side of the path of the products to be treated.

Said fixed supporting members 33 and 32 are located some distance from the normal path of the products to be treated so as only to come into contact with same in the case of a break or gap in said products. This case is shown in Fig. 4 wherein the front portion of a sheet of cardboard 8, which is engaged between the first rollers 13x—14y, rests on the lower fixed supporting members 32 and slides along same until it engages between the second pair of rollers 13x—14y. During normal operation, the fixed supporting members are not in contact with the products to be treated, as shown for the sheet 8a which is solely supported by the rotary conveying rollers 13x and 14y.

In order to allow the fixed members 32 and 33 to pass, the rollers 13x and 14y are provided with grooves 34 (see Fig. 6), in which the members 32 and 33 are lodged without touching either the rotary rollers, or the products to be treated.

One end of the fixed members 32 and 33 is secured to the framework of the machine, for example by means of channel irons 35 and 36 respectively, whereas the other end, which passes through guide bars or rollers 37 and 38 respectively, and guide rollers 39 and 40 respectively, is provided with tensioning means that enable the fixed members to be subjected to a suitable tension so as to ensure their correct and straightened position and operation. In the example shown, the tensioning means comprise springs 41 and 42 which are attached to the ends of the fixed members 32 and 33 respectively and are adapted to be tensioned by means of nuts 43 and 44, respectively, which screw on screw-threaded rods 45 and 56 secured to the springs 41 and 42, respectively, and which press against the channel irons 47 and 48, respectively.

Fig. 7 shows a modification of the rotary members, wherein the conveying rollers 13 and 14 are formed by separate rollers 13a, 13b, 13c, and 14a, 14b, 14c respectively. These elemental rollers are mounted on their respective shafts 49 and 50 in such a manner as to leave between them spaces 51 and 52 respectively, through which the fixed supporting members 32 and 33 respectively pass.

It should be noted that in Fig. 7, the upper and lower fixed members 33 and 32, respectively, are staggered with respect to one another in the transverse direction of the travel of the product. However, it is also possible to provide an arrangement in which these members are located opposite one another. Similarly, instead of being staggered in the longitudinal direction, the conveying rollers 13 and 14 could be located exactly opposite one another.

Of course, the embodiments hereinbefore described and illustrated in the drawings are only given by way of mere non-limitative examples, and it is possible to change in any suitable manner the nature, the shape, the arrangement and the mounting of their elements, without thereby exceeding the scope of the invention. Thus, the fixed members could be formed by sections of bars or the like, arranged between the rotary conveying rollers. Furthermore, the application of the device according to the invention is not restricted to drying machines, but said device can be used for all kinds of treating machines, such as vaporizing machines or the like, for the treatment of web products of any nature, such as cardboard or the like. Optionally, it may be only necessary to provide the conveying rollers and the fixed supporting members underneath the product to be treated.

Having thus described the invention, what is claimed as new and desired to be secured by Letters Patent, is:

1. The combination, in a drying and like treating apparatus for lengthy cloth and like cellulosic material, of a plurality of spacedly and oppositely arranged blowing nozzle means for directing drying fluid onto said material, exhaust means for removing spent fluid and positioned between said blowing nozzle means, said oppositely arranged nozzle means and exhaust means forming a path therebetween along which said material travels, with conveying means for said material and arranged to extend along and within said path, said conveying means comprising a first group of rotatable conveying members extending lengthwise of said nozzle means and with their axes crosswise to said material, said rotatable conveying members having surfaces for guiding said material along said path past said nozzle means, and a second group of substantially flexible conveying members extending substantially at right angles to said axes of said rotatable conveying members and provided with conveying surfaces recessed a predetermined distance below the surfaces of said rotatable conveying members to thereby normally avoid contact with the material, said flexible conveying members being adapted to support and maintain said material in said path and substantially in contact with said rotatable conveying members if said material suffers a break along its path past said nozzle means.

2. The combination, in a drying and like treating apparatus for lengthy cloth and like cellulosic material, of a plurality of spacedly arranged blowing nozzle means for directing drying fluid onto said material, exhaust means for removing spent fluid and positioned between said blowing nozzle means, with conveying means for said material extending lengthwise of said exhaust means and said blowing nozzle means, said conveying means comprising rotatable conveying rollers having surfaces spaced from each other for contact with said material and for guiding same along a predetermined path past said nozzle means, and flexible elongated means extending along said path and provided with surfaces recessed a predetermined distance below said surfaces of said rollers and of said material to thereby normally avoid contact with the latter, said elongated means being disposed to extend adjacent and substantially in crosswise direction to the axes of said conveying rollers to thereby maintain said material along said path in contact with said conveying rollers if said material suffers a break along its path past said nozzle means.

3. The combination according to claim 2, wherein said elongated means are arranged in spaced relation to each other and are accommodated within the spaces between said rollers.

4. The combination according to claim 2, wherein said elongated means are displaceably and adjustably arranged with respect to said rotatable conveying rollers.

5. The combination according to claim 2, wherein the surfaces of said rotatable conveying rollers are separated by a plurality of grooves within which said flexible means are extended.

6. The combination according to claim 2, wherein said rotatable conveying rollers are arranged within said exhaust means, respectively, said flexible means being in the form of cables.

7. The combination according to claim 2, wherein said conveying rollers are arranged in opposed relation to each other and spaced from each other to thereby form upper and lower rollers, respectively, so as to define said predetermined path for guiding and moving said material, each of said rollers including roller elements forming spaces therebetween, said elongated means being arranged within said spaces of said roller elements, the roller elements of said upper rollers being arranged in staggered relation to the roller elements of said lower rollers, whereby said elongated means extend in staggered relation to each other.

8. The combination according to claim 2, wherein said flexible means are endless, and means for guiding said endless flexible means to at least partly extend in lengthwise direction of said path.

9. The combination according to claim 2, wherein said flexible means are provided with tensioning means arranged remote from said path of said material.

10. The combination according to claim 2, including guide means positioned remote from said nozzle means, said exhaust means and said rollers and engageable with said flexible means to divert the latter without said path of said material.

JULIEN DUNGLER.

References Cited in the file of this patent

UNITED STATES PATENTS

| Number | Name | Date |
|---|---|---|
| 853,480 | Smith | May 14, 1907 |
| 1,042,441 | Hurlbut | Oct. 29, 1912 |
| 1,070,933 | Wilson | Aug. 19, 1913 |
| 1,178,286 | Anderson | Apr. 4, 1916 |
| 1,517,739 | Lotz | Dec. 2, 1924 |
| 1,550,695 | Hanson et al. | Aug. 25, 1925 |
| 1,715,301 | Mason et al. | May 28, 1929 |
| 1,857,605 | Rapley | May 10, 1932 |
| 2,141,578 | Wellmar | Dec. 27, 1938 |
| 2,164,919 | Harmon | July 4, 1939 |
| 2,296,897 | Billing et al. | Sept. 29, 1942 |
| 2,377,525 | Schutt | June 5, 1945 |
| 2,462,380 | Gautreau | Feb. 22, 1949 |